June 24, 1952 W. H. NORDENSON 2,601,553
TRACTOR REAR AXLE FOR CROP CLEARANCE
Filed March 6, 1948 4 Sheets-Sheet 1

INVENTOR.
W. H. NORDENSON
ATTORNEYS

June 24, 1952 W. H. NORDENSON 2,601,553
TRACTOR REAR AXLE FOR CROP CLEARANCE
Filed March 6, 1948 4 Sheets-Sheet 2

FIG. 2

INVENTOR.
W. H. NORDENSON
BY
ATTORNEYS

June 24, 1952 W. H. NORDENSON 2,601,553
TRACTOR REAR AXLE FOR CROP CLEARANCE
Filed March 6, 1948 4 Sheets-Sheet 3

INVENTOR.
W. H. NORDENSON
BY
ATTORNEYS

Patented June 24, 1952

2,601,553

UNITED STATES PATENT OFFICE 2,601,553

TRACTOR REAR AXLE FOR CROP CLEARANCE

Willard H. Nordenson, Rock Island, Ill., assignor to Deere Manufacturing Co., Dubuque, Iowa, a corporation of Iowa Application March 6, 1948, Serial No. 13,491

10 Claims. (Cl. 180—75)

This invention relates to a tractor and more particularly to a tractor of the agricultural type.

Agricultural tractors fall into two general classes: The four-wheeled or narrow tread tractor; and the tricycle type or wide-tread tractor. The present invention is concerned particularly with a tricycle type tractor and the principal object of the invention is to improve the rear end construction of such tractor, particularly with respect to the adjustability of the treads of the rear traction wheels.

Although all tricycle tractors are generally alike in that each includes a longitudinal narrow body carried on a steerable front truck and laterally adjustable, relatively widely spaced rear traction wheels, there are some major differences in the construction with respect to the manner in which adjustment of the traction wheel treads is accomplished. In one type of tractor the rear axle construction is of the so-called straight-through type; that is to say, the tractor includes a pair of coaxial oppositely extending drive axles on each of which is mounted a relatively large traction wheel. Variation in tread is accomplished by sliding the wheels axially on the axles. In another type of tricycle tractor, the rear body construction includes a transverse axle structure having respectively at the outer ends thereof depending housing portions on each of which is carried a relatively short transverse drive axle for the mounting of a traction wheel. In a tractor of the latter type the traction wheels may be made somewhat smaller, inasmuch as the depending housings lower the wheel axis. In addition to permitting the use of smaller traction wheels, a tractor of the type having depending axle housings has another advantage; to wit, the depending housings provide for the use of reduction gearing contained within these housings instead of in the transmission and differential casings, thus reducing the size of the transmission and differential gears. For row-crop operation—which is the primary use of a tricycle type tractor—crop clearance is obtained in the first mentioned type of tractor by means of the relatively high straight-through axle structure, and crop clearance in the second type of tractor is obtained by means of the arched construction provided by the intermediate axle housings and the opposite depending housings.

In a tractor of the type having depending housings it has heretofore been necessary, in order to obtain proper crop clearance, to space the depending housings relatively widely apart and to provide wheels having offset and removable hub portions to accommodate tread variations. In such tractor, even though the desired tread variation is obtainable, the depending housings were found in many cases to interfere with crops planted in relatively widely spaced rows. According to the present invention, it is an important feature to provide a tractor of the type having depending housings but in which the depending housings are located closely adjacent the tractor main body structure; in other words, these housings are remote from rather than close to the traction wheels. It is an important object of the invention to space these housings laterally apart on the order of the relatively narrow width of the tractor body so that there is provided below the rear portion of the tractor a relatively narrow longitudinally extending clearance space or tunnel by means of which crop clearance can be obtained, especially when the tractor is provided with a wide tread high clearance front axle, which is not an uncommon practice in the planting and cultivation of certain crops.

Other important objects of the invention relate to the provision of: An improved depending housing structure that is of such design that it may be used interchangeably between the right hand and left hand sides of the tractor; improved housing structure including a member which serves to journal part of the tractor driving mechanism and which in addition provides pilot means for facilitating the mounting of the depending housing structure on the tractor body; a novel lubricating means directed particularly to a system for preventing the escape of lubricant from the gear housing to an associated brake mechanism housing; adequate bearing structure for accommodating the relatively long drive axle that is peculiar to the location and structure of the depending housings; and other features that contribute to low manufacturing costs and efficiency of operation of tractors in general.

The foregoing and other important objects and desirable features inherent in and encompassed by the invention will become apparent to those skilled in the art as a complete disclosure of the invention is made in the following detailed description, taken in conjunction with the accompanying sheet of drawings wherein there is shown, by way of example, a preferred form of the invention.

The tractor in general is somewhat similar in appearance to presently known agricultural tractors, with the exception of differences to be pointed out below. The tractor includes a longitudinal relatively narrow body made up of a rear transmission and differential casing 20, an intermediate propeller shaft and clutch housing 21 and a forwardly located internal combustion engine 22. The body further includes a grille and hood structure 23 behind which is located an operator's seat 24, which is here shown as being directly above a power control housing 25 at the rear end portion of the transmission and differential casing 20. The forward end of the body is carried on a steerable front wheel structure 26 which may be operated in the conventional manner by means of a steering wheel 27 located adjacent the seat 24.

The rear end of the tractor body includes a rear axle structure made up of right hand and left hand housing structures, designated generally by the numerals 30 and 31, respectively. The right hand housing structure journals a transverse drive axle 32 on which is mounted a right hand traction wheel 33. The left hand axle structure 31 journals a transverse drive axle 34 on which is mounted a left hand traction wheel 35. The power control housing 25, which may be of any well known construction, is here shown as including a transverse rockshaft structure 36 at opposite ends of which are power lift arms 37. The tractor is shown as equipped with a drawbar 38 which is carried by the rear axle structures 30 and 31, in a manner to be described hereinafter.

The engine 22 of the tractor may supply power through a clutch and propeller shaft (not shown) in the housing 21, as is conventional, and power is transmitted to transmission gearing (not shown) contained in the transmission and differential housing 20. Such transmission mechanism may be of any conventional type including a driving member for differential mechanism, indicated generally by the numeral 40 in Figure 4. This differential may be of conventional construction and includes a bevel pinion 41 and right and left hand carrier parts 42 and 43 forming a housing within which are included right and left hand differential gears 44 and 45 and differential pinions 46.

Figures 4, 5:
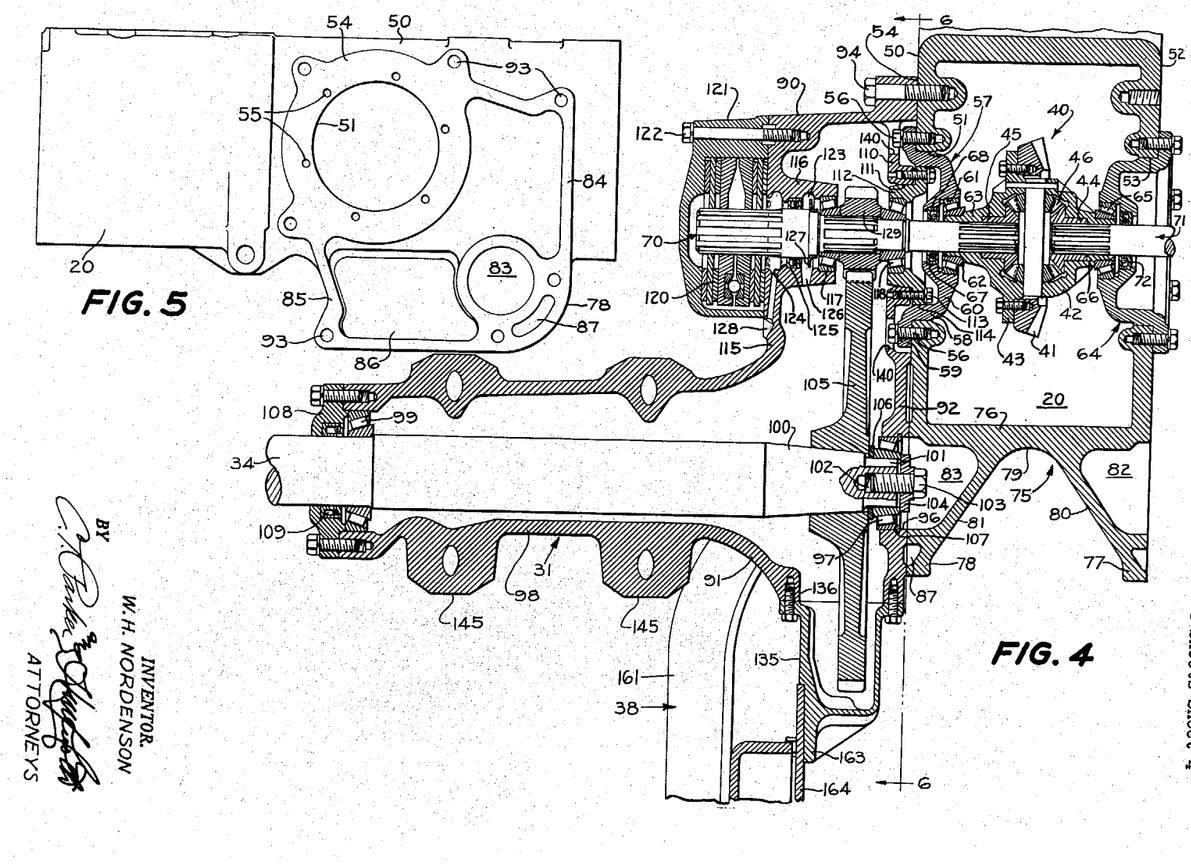
Figure 4 is an enlarged fragmentary transverse sectional view showing the rear portion of the transmission and differential casing and the left hand depending housing, the section being cut through several planes, as indicated by the line 4—4—4—4—4 of Figure 2.
Figure 5 is a side elevation view showing the left hand side of the transmission and differential casing, the figure being slightly enlarged with respect to Figure 2 and slightly reduced with respect to Figure 4.

As best shown in Figure 5, the transmission casing 20 is provided at its rear end with a left hand side wall 50 which is apertured or provided with a circular opening 51. As shown in Figure 4, the casing includes a right hand side wall 52 formed with a similar circular opening 53 transversely aligned with the opening 51. Since opposite sides of the casing 20 are identical, only the left side thereof will be described, particular reference being had to Figures 4, 5 and 6. The left hand casing wall 50 is provided with a circular mounting surface 54 surrounding the opening 51. This portion of the wall 50 is provided with a circle of tapped bores 55 into which are threaded a plurality of cap screws 56 for the purpose of securing to the side wall 50 a flanged cup-shaped member, indicated generally by the numeral 57. The member 57 includes an annular portion 58 preferably provided with a machined outer surface that fits within the opening 51 in the casing side wall 50. Integral with the annular portion 58 is a radially outwardly extending circular flange 59 which is drilled to receive the cap screws 56. Also integral with the annular portion 58 is a radial flange 60 forming, in effect, the bottom of the cup-shaped member. This radial wall is apertured or bored at 61 for the purpose of carrying an anti-friction bearing 62 which journals the outer end of a sleeve 63 formed integral with the left hand differential carrier part 43. A similarly constructed cup-shaped member 64 is provided in the opening 53 in the right hand casing side wall 52 and this member includes a bearing 65 for journaling an integral sleeve portion 66 on the right hand differential carrier part 42.

The member 57 includes a reduced counterbore 67 in which is carried an inner shaft seal 68.

The left hand differential gear is internally splined, as is usual, and carries the externally splined inner end of a laterally outwardly extending power shaft 70, which forms part of the mechanism for driving the left hand rear axle 34, the details of which will presently appear. The inner portion of the shaft extends through and is appropriately sealed by the lubricant seal 68. A right hand power shaft 71 has an externally splined inner end connected to the right hand differential gear by means of an internal spline on the latter. This shaft extends laterally outwardly to the right and forms part of the driving mechanism for driving the right hand axle 32. The right hand member 64 is provided with an appropriate lubricant seal 72 for sealing around the inner portions of the shaft 71. The members 57 and 64 constitute, in effect, closure members for the casing side walls and the casing 20 is thus provided with a lubricant-containing compartment in which the transmission and differential mechanism operate, the lubricant seals 68 and 72 minimizing the escape of lubricant from this compartment into either of the axle housing structures 30 or 31.

Figure 3:
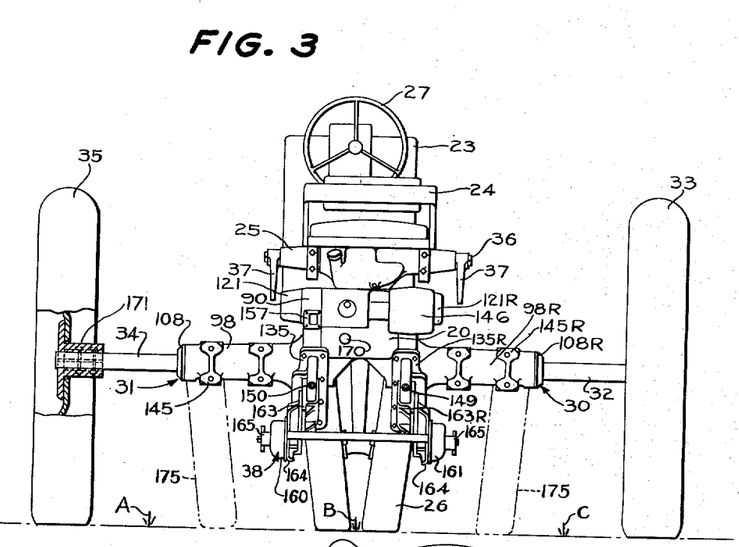
Figure 3 is a rear end elevational view, on a slightly reduced scale, of the tractor.

The casing 20 is provided with bottom wall structure, designated generally by the numeral 75, providing a transverse bottom wall 76 and right and left hand depending wall portions 77 and 78 that extend below the general level of the wall 76 and provide reenforcement means for the axle housing structures 30 and 31. As best shown in Figures 3 and 4, the bottom wall structure 75 is arched at its upper portion, as at 79, and slopes laterally outwardly and downwardly in opposite directions, as at 80 and 81, respectively, to provide, in effect, a longitudinally running tunnel substantially on the longitudinal center line of the tractor. The sloping portions 80 and 81 blend respectively with the depending side wall portions 77 and 78 (Figure 4). The depending wall portions 77 and 78 are provided respectively with pockets or recesses 82 and 83, which are preferably circular and coaxial on a transverse axis below and to the rear of the transverse axis of the power shafts 70 and 71. The left hand casing wall 50 includes, as a continuation of the mounting surface 54 around the circular opening 51, a machined mounting surface 84 which covers a substantial area of the wall 50, including that portion of the wall surrounding the circular recess or pocket 83. It will be noted from Figure 5 that the depending wall structure 78 has a substantial longitudinal extent and is projected forwardly to a point substantially directly below the circular opening 51, as indicated at 85. This portion may be relieved or recessed at 86; and the rearward portion of the depending wall structure 78 may be further relieved or recessed, as at 87. The arrangement is such that the entire vertical mounting surface, including the portions 54 and 84, may be machined in one operation. It will be understood of course that the opposite side wall 52 and depending wall portion 77 are similarly formed.

As best shown in Figure 4, the left hand axle housing structure 31 is generally in the form of a T lying on its side, with the cross bar of the T extending vertically and the leg extending horizontally. In this case the leg portion of the T extends laterally to the left. In the case of the right hand axle structure 30 the leg of the T portion would extend laterally to the right. Since the axle housing structures are identical, only the left hand structure will be described in detail. Further, as will hereinafter be pointed out, the axle housing structures 30 and 31 are interchangeable from the right to the left hand side of the casing or vice versa.

The vertical part of the left hand axle housing structure 31 includes an upper portion 90, which receives or encloses an outer portion of the power shaft 70, and a lower housing portion 91, which depends to a substantial distance below the general level of the bottom wall 76 of the casing 20. The portions 90 and 91 are, of course, integral and are joined by an inner vertical wall 92 which lies flush substantially throughout its area against the machined outer surface including the portions 54 and 84 of the left hand casing side wall 50, the two juxtaposed walls being rigidly secured together to form, in effect, a unitary vertical wall structure. The securing means for connecting the axle housing structure 31 to the left hand side wall of the casing 20 includes a plurality of tapped bores 93 in the casing side wall and a plurality of cap screws 94 passed through drilled or apertured ears 95 integral with the inner wall structure of the axle housing. Since the lower portion 91 of the axle housing 31 includes the lower part of the wall 92, the axle housing will be reenforced by the reenforcing structure 75 at the bottom of the casing 20. The lower portion of the wall 92 is provided with a circular aperture or bore 96 in transverse alignment with or coaxial with the recess 83 in the depending wall portion 78 of the casing. This bore includes bearing means comprising an anti-friction bearing 97.

The laterally outwardly extending portion of the T that forms the housing structure 31 comprises a generally tubular axle housing 98 which is relatively long and narrow. The outer end of the tubular axle housing is internally reduced and provided with bearing means in the form of an anti-friction bearing 99. This bearing is coaxial with the bearing 97 previously described as being recessed in the inner wall structure comprising the wall portions 78 and 92. The bearings 97 and 99 are rather widely spaced apart in accordance with the extreme length of the tubular housing 98. The innermost end of the left hand driving axle 34 is tapered at 100 and further reduced at 101. The reduced portion 101 is journaled in the bearing 97 and is further provided with an axial tapped bore 102 which receives a cap screw 103 that passes through a retaining member 104. The tapered portion 100 of the axle 34 has mounted thereon and keyed thereto a rotatable member in the form of a relatively large final drive gear 105. This gear is located outwardly of but closely proximate to the bearing 97. The cap screw 103, together with the retaining member 104 and a washer 106 interposed between the gear and bearing, secures the bearing and gear to the axle. The bearing 97 is held against axial inward movement by means of a snap ring 107. The outer end of the tubular axle housing 98 includes an apertured cap 108 which retains the bearing 99 and which includes a lubricant and dirt seal 109.

The upper portion of the axle housing wall 92 adjacent the upper housing portion 90 is provided with bearing carrier means and to this end is set back laterally, as at 110, with respect to the remainder of the wall 92. This wall portion 110 is apertured at 111 coaxially with the circular opening 51 in the casing side wall 50 and carries therein a flanged ring 112.

The flanged part of the ring 112 is secured to the inner face of the wall portion 110, preferably by cap screws 113, and the outside diameter of the flange is such as to fit rather closely within a machined inner surface 114 on the annular portion 58 of the cup-shaped member 57. The arrangement is such that the flange on the ring 112 cooperates with the inner surface 114 on the member 57 to serve as pilot means when the axle housing 31 is assembled to the casing 20, the member 57 first being assembled to the casing 20 and the flanged ring 112 being preliminarily assembled to the wall portion 110 of the axle housing 31.

The upper housing portion 90 includes outer wall structure 115 integral with the tubular axle housing portion 98. The wall portion 115 is laterally spaced outwardly from the inner wall portion 110 and is provided with an integral inwardly extending sleeve 116 coaxial with the flanged ring 112. The sleeve opens outwardly through the wall 115 and is provided with an inner end portion terminating short of and spaced axially outwardly from the inner portion of the flanged ring 112. The sleeve 116 of course encircles the outer portion of the power shaft 70 and is provided with an anti-friction bearing 117 for journaling the shaft. The flanged ring 112 carries a second anti-friction bearing 118 for journaling the shaft at a portion thereof spaced axially inwardly from the bearing 117. That portion of the power shaft 70 that extends axially outwardly beyond the outer wall 115 of the axle housing structure 31 is splined or otherwise connected to brake mechanism, indicated generally by the numeral 120. This mechanism may be of any conventional construction and is here shown as a brake of the disk type, the structure and operation of which will be familiar to those skilled in the art; therefore, further description of the brake mechanism is deemed unnecessary. The brake mechanism is enclosed by a cover or closure structure in the form of a cup-shaped housing 121 secured to a machined outer surface of the outer wall 115 by a plurality of cap screws 122, only one of which appears in Figure 4.

As previously stated, the wall structure providing the casing 20 establishes a first lubricant-containing compartment which is preferably separated from the lubricant-containing compartment formed by the axle housing structure 31. Inasmuch as the braking mechanism 120 will be adversely affected by lubricants, it is desirable to keep the lubricant in the gear housing compartment from escaping into the compartment provided by the brake housing 121. Part of the means for preventing such escape of lubricant includes inner and outer annular grooves 123 and 124 formed in the interior surface of the sleeve 116. A lubricant seal 125 is interposed between the grooves and surrounds the power shaft 70. A drain hole 126 is provided at the bottom of the inner groove 123 for the purpose of draining lubricant from the groove back into the interior of the axle housing. The shaft 70 carries for rotation therewith an oil slinging means 127 which extends radially outwardly from the shaft substantially within the confines of the groove 123. The outer groove 124 is communicated with the exterior of the housing 31 by means of a drain passage 128 preferably drilled upwardly through the vertical section of the outer housing wall 115. It will be noted that the exit of the passage 128 is at a point on the wall 115 radially outwardly of the brake housing 121, so that lubricant drained from the outer groove 124 will not drain into the brake compartment. That portion of the power shaft 70 intermediate the bearings 117 and 118 is splined and carries for rotation therewith a driving part in the form of a gear or pinion 129 which is in constant mesh with the final drive gear 105. During operation of the tractor, rotation of the gears 105 and 129 will convey lubricant upwardly from the supply in the bottom of the housing 31 to the bearings 117 and 118. Any lubricant that finds its way along the shaft toward the casing 20 will find its progress impeded by the seal 68; further, centrifugal force from the shaft will tend to throw the lubricant off against the interior surfaces of the flanged ring 112 and member 57. In any event, should lubricant escape past the seal 68, it will drain into the compartment in the casing 20, which is immaterial. On the other hand, lubricant escaping to the left along the shaft 70 will, if it gets past the seal 125, be prevented from entering the brake mechanism compartment by virtue of the fact that it will be thrown off the shaft into the outer groove 124, whence it will drain outwardly through the passage 128. The oil slinging means 127 operates to minimize to the greatest extent possible the amount of lubricant that will get past the seal 125, since this means will throw the lubricant off to the groove 123, whence it will drain through the passage or opening 126 back into the compartment of the gear housing.

The lubricant-containing capacity of the housing structure 31 is established by a lower closure or cap member 135 which is secured to the lower portion 91 of the housing 31 over an opening 136 through which the lower portion of the gear 105 projects. The construction in this respect may be similar to constructions already known.

Adding to the compactness of the structural relationship between the casing 20 and the axle housing structure 31, is the provision in the set back wall portion 110 of the axle housing wall 92 of a plurality of openings 140 in which the heads of the cap screws 56 are recessed or accommodated.

The foregoing completes the description of the internal components of the improved structure. For the purpose of clarifying the description and readily identifying the various parts between the right hand and left hand structural units, particular reference will be had to the left hand unit and reference numerals will be applied thereto. Similar parts in the right hand unit will be designated by the same reference numerals to which will be added the letter R where the parts are common to both units.

Figure 6:
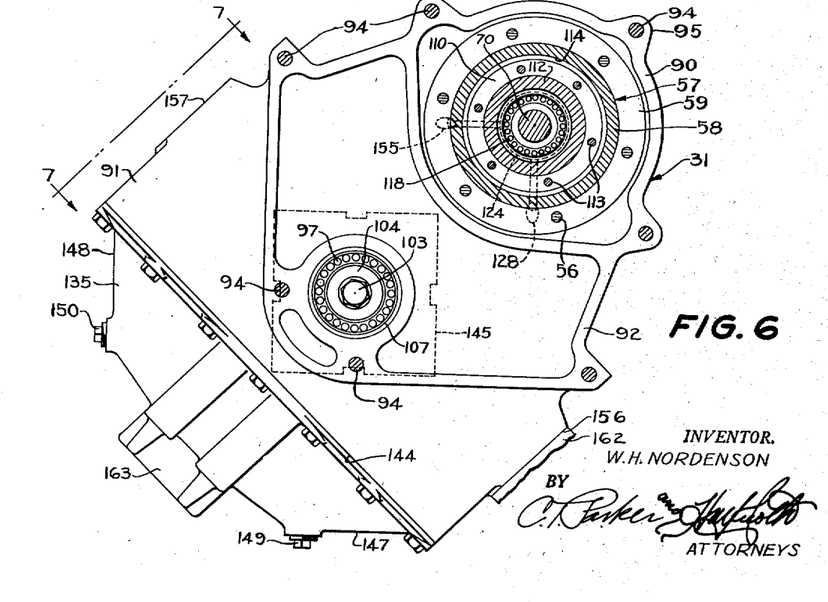
Figure 6 is a sectional view taken through a plane including the line 6—6 of Figure 4 and showing the inside face of the left hand depending housing structure.

The tubular axle housing portion 98 of the axle housing structure 31 includes thereon a pair of axially spaced enlarged portions having angularly related outer surfaces arranged in such fashion as to form a square, as at 145 in Figure 6. There are preferably two such portions on the tubular axle housing 98 and these serve for the mounting of implements on the axle structure. This particular means forms no part of the present invention and is illustrated here only for the purpose of indicating that this tractor is so equipped.

The tractor is further shown as including a rear mounted belt pulley 146, the drive for which may be of any conventional construction and which is not illustrated inasmuch as it forms no part of the present invention.

As best shown in Figures 5 and 6, a straight line drawn through the axes of the shaft 70 and axle 34 is inclined at an angle of 45 degrees, thus locating the axle axis rearwardly and below the power shaft axis. As stated above, it is a feature of this invention that the axle housing structures 30 and 31 are interchangeable from side to side. Since these structures may be manufactured from identical patterns and undergo identical machining operations, it will be seen that great savings in production are realized. The design of each axle housing structure is such that in most cases each component of each structure is utilized in the same fashion regardless of whether the structure is mounted at the right hand or the left hand side of the casing 20. If there are exceptions to this procedure, the related parts are used in related manner.

Figures 1, 7:
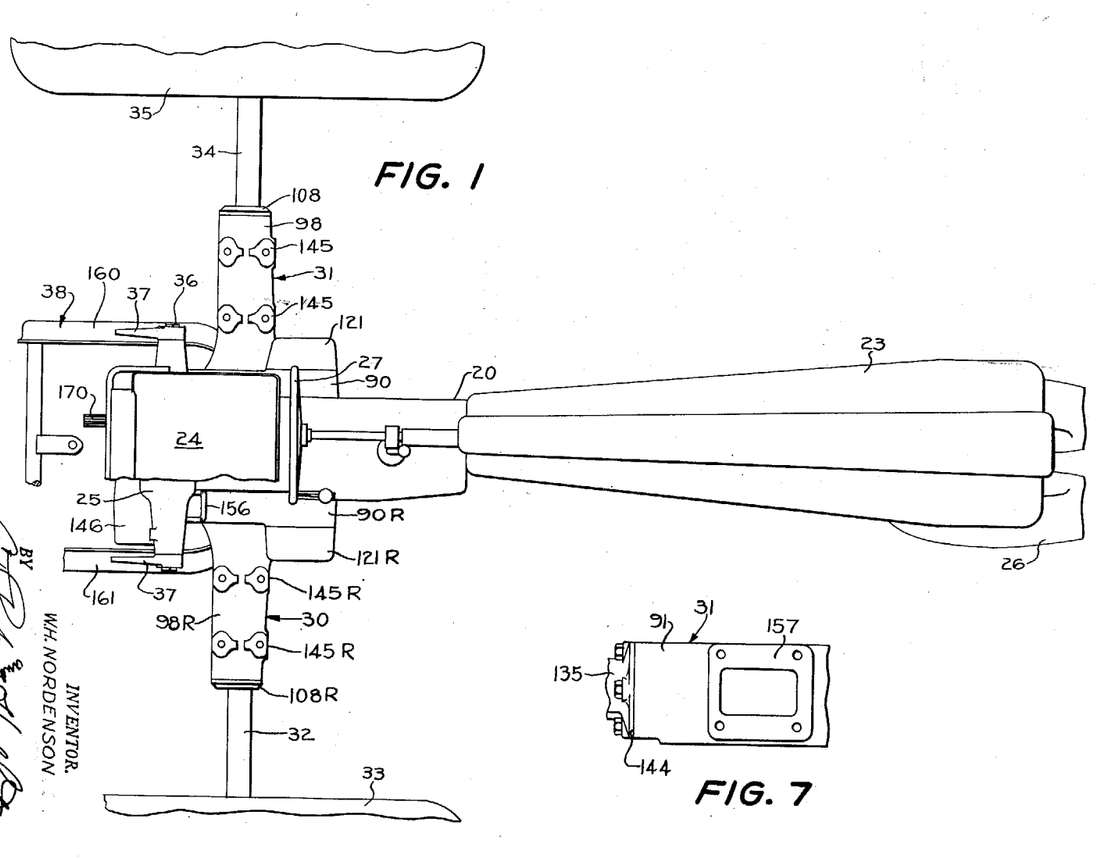
Figure 1 is a general plan view of the tractor.
Figure 7 is a fragmentary end view, as viewed along the line 7—7 in Figure 6 and showing one of the mounting pads on the depending housing structure.
Figure 2:
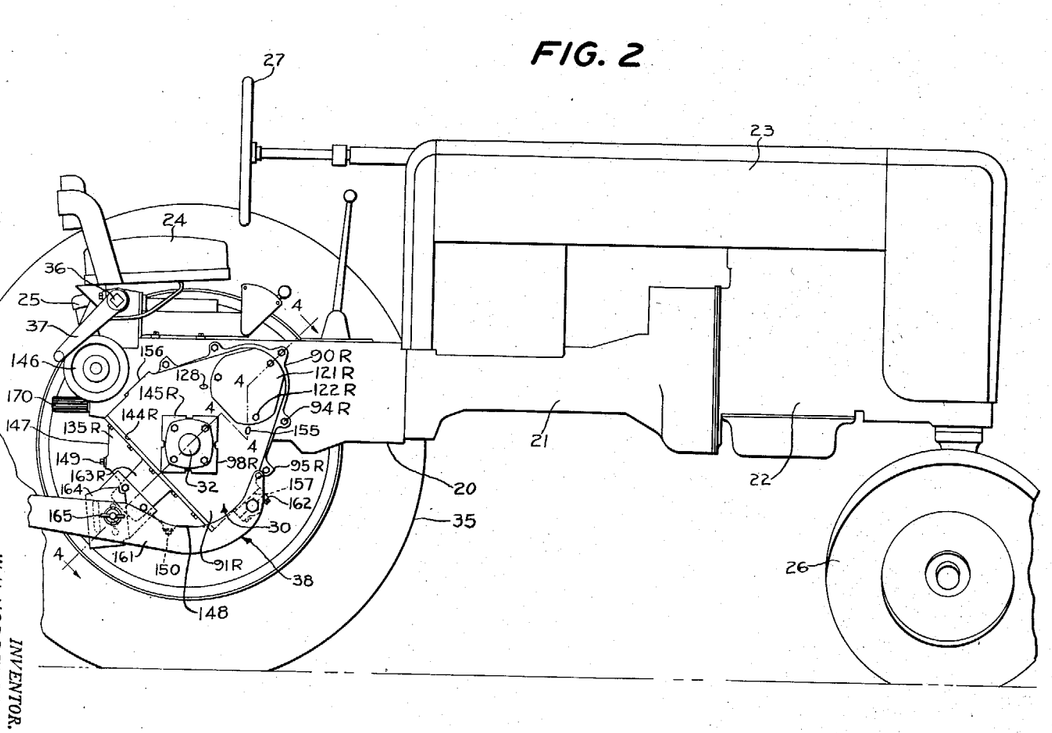
Figure 2 is a general side elevational view of the tractor with the right hand traction wheel removed.

The bottom of the lower housing portion 91 that surrounds the opening 136 is flat and when the housing structure is attached to the casing 20 this bottom portion is at an angle of 45 degrees, as indicated at 144 in Figure 6 and at 144R in Figure 2. The attached closure or cap 135 is provided with first and second angularly related surfaces 147 and 148. The angle between these surfaces is preferably 90 degrees, to accord with the 45 degree angle that the housing structure as a whole assumes. The wall portion 147 is provided with a removable plug 149 and the wall portion 148 is provided with a removable plug 150. When the housing structure is utilized at the left side of the tractor, the plug 150 is a filler plug provided for the purpose of adding lubricant to the gear housing, whereas the plug 149 is a drain plug. When the housing structure is used at the opposite side of the tractor, the positions and functions of the plugs 149 and 150 are reversed.

As best shown in Figures 2 and 6, the housing structure 31 is provided with a second oil drain passage 155 which is similar to the oil drain passage 128 in that it communicates with the outer oil groove 124; however, the oil passage 155 is at a 90 degree angle to the passage 128, so that when the axle housing unit is at the left side of the tractor, the passage 128 extends downwardly and serves to drain the groove 124 while the passage 155 extends horizontally and is idle. On the other hand, when the axle housing structure is at the right hand side of the tractor, the passage 155 is vertical and serves to drain the groove 124 while the passage 128 is then horizontal and idle.

As previously stated, the tractor drawbar 38 is carried by the axle housing structures 30 and 31. For this purpose, the axle housing structure is provided with opposite end surfaces provided respectively with mounting pads 156 and 157. These pads are inclined at an angle of 45 degrees. In the case of the left hand axle housing structure 31, the mounting pad 156 is the forward and lower pad (Figure 6), whereas the pad 157 is an upper and rearward pad (see also Figure 3). When the housing structures are reversed from side to side, the mounting pads are also reversed, as best shown in Figure 2.

The draw-bar is of U-shaped construction and includes a pair of parallel forwardly extending legs 160 and 161, each of which includes a supporting bracket 162 for attachment to the mounting pad 156 on the left hand axle structure and the mounting pad 157 on the right hand axle structure. Each of the cap members 135 and 135R includes a depending portion 163 and 163R, respectively, on each of which is carried an apertured plate 164. Each of the drawbar legs 160 and 161 carries a locking means 165 cooperating respectively with the locking plates 164, the detailed construction of which is shown in United States Patent No. 2,503,096. Since the drawbar 38 is carried for vertical swinging movement about a horizontal axis by means of the bearing brackets 162, the locking means 164—165 provides means for holding the drawbar in various positions of vertical adjustment.

The tractor may also be equipped with the usual rearwardly extending power take-off shaft 170, which may be driven in any conventional manner from the transmission mechanism (not shown).

Lateral adjustment of the wheels 33 and 35 respectively on the axles 32 and 34 for the purpose of varying the tread of the tractor is accomplished by means of sliding the wheels axially on the axles. A preferred form of construction provided for the accomplishment of this adjustment is indicated in Figure 3, where a portion of the left hand wheel 35 has been broken away to illustrate what may be a conventional split hub construction 171, which serves in the conventional manner to clamp the wheels releasably to the axle. Inasmuch as such constructions are well known, it is deemed unnecessary to describe the same in detail here. It should be understood, of course, that a similar construction is provided for the right hand wheel 33.

Figure 3 further designates in broken lines at 175 a pair of widely spaced front wheels which may be part of a conventional wide tread attachment substituted for the usual centrally located front wheel steerable truck 26. Since such wide tread axle attachments are conventional, further illustration and description thereof is believed to be unnecessary here. The widely spaced wheels 175 are shown in connection with spaced crop rows, indicated at A, B, and C. It will be noted that the center crop row B is substantially on the longitudinal center line of the tractor and is centrally between the front wheels 175 and between the rear wheels 33 and 35. It will be further noted that the casing bottom structure 75, which has hereinbefore been described as providing a longitudinally extending tunnel, is centrally above the center row B. If it be assumed that the crops growing in the row B are as high as those usually cultivated, such as corn for example, it will be seen that the tunnel structure provides adequate clearance space between the depending housing portions of the axle housing structures. It will further be noted that the crops at A and C are just inside the rear wheels 35 and 33 respectively. If the tractor were a conventional tricycle type tractor of the kind having depending housings at the outer ends of an arched axle construction, such depending housings would be approximately above the crops in the rows A and C. Now, if it be assumed that these crops were taller, it will be seen that such depending housings would pass directly over or through the crops, a result that is not desirable. In the foregoing description and illustration by way of example, it should be assumed that the tractor will have mounted thereon an implement of the usual type used in cultivating, in which case the drawbar 38 will be removed or will be swung vertically about its pivotal connections 162 to dispose the transverse portion thereof at a sufficient height to clear crops in the central row B.

In row crop operations in which the tractor is operated as a strictly tricycle type with the steerable front wheeled truck 26 in place of the wide tread wheels of the wide tread attachment 175, it will be seen that the relatively closely spaced depending housing portions will clear crops planted in other row spacings than those illustrated. In addition to the function of providing a central clearance space between the depending housings, the tunnel structure 75 provides for reenforcing the side portions of the transmission and differential casing 20 and further reenforces the inner portions of the axle housing structures 30 and 31, enabling the use of the relatively long tubular axle housing portions 98 and 98R. In tractors in which the depending portions are at the outer ends of the tubular axle housings, the attaching surfaces between the housings and the central casing are of relatively small areas and additional and costly means must be provided for making these parts sufficiently strong for the purposes intended.

In the tractor of the type referred to, the axles propelling the traction wheels are relatively short and are usually carried on a pair of relatively closely spaced bearings which adequately support the same. In the present case, adequate provision is made for supporting the drive axles 32 and 34 by means of the relatively widely spaced bearings 97 and 99. It will be noted that these bearings are as widely spaced as possible in the axle housing structures, which is a distinct advantage over the location of the inner bearing, for example, to the left of the gear 105. The relatively widely spaced location of the bearings 97 and 99 is important from the standpoint of minimizing bending moments that may occur in the axles because of their extreme length.

Other features and objects of the invention have been pointed out above. Still other features of the invention will undoubtedly occur to those skilled in the art and it is not intended that the precise and detailed description and illustration of the preferred form of the invention exclude other applications of the invention, for the invention is capable of numerous modifications and alterations without departing from the spirit of the invention as defined in the appended claims.

What is claimed is:

1. In a tractor: a longitudinal body structure including a casing having an apertured side wall; a housing alongside the casing and open in transverse alinement with the casing wall aperture, and having a laterally outwardly spaced outer wall provided with a sleeve portion opening outwardly through said outer wall and projecting axially inwardly toward the casing wall and having its inner end spaced from said casing wall; drive means in the casing including a transverse rotatable member extending through the casing wall aperture and through the sleeve and projecting outwardly beyond the outer wall of the housing; drive means in the housing including a rotatable part on the rotatable member between the casing wall and the inner end of the sleeve; means providing an annular lubricant groove in the inside surface of the sleeve between the inner end of the sleeve and the outer surface of the housing outer wall; brake mechanism connected to the rotatable member outside and adjacent the outer wall of the housing; closure means secured to the housing and enclosing the brake mechanism; means providing a lubricant drain including a passage communicating with the lubricant groove and opening through the outer surface of the housing outer wall radially outwardly of the brake mechanism closure means.

2. In a tractor: a longitudinal body structure including a casing having an apertured side wall; a gear housing alongside the casing and open in transverse alinement with the casing wall aperture, and having a laterally outwardly spaced outer wall provided with a sleeve portion opening outwardly through said outer wall and projecting axially inwardly toward the casing wall and having its inner end spaced from said casing wall; drive means in the casing including a transverse rotatable shaft extending through the casing wall aperture and through the sleeve and projecting outwardly beyond the outer wall of the housing; drive means in the gear housing including a gear on the shaft between the casing wall and the inner end of the sleeve; means providing a pair of axially spaced annular lubricant grooves in the inside surface of the sleeve, one adjacent the inner end of the sleeve and the other adjacent the gear housing outer wall; brake mechanism connected to the shaft outside and adjacent the outer wall of the gear housing; closure means secured to the gear housing and enclosing the brake mechanism; means providing a lubricant drain hole in the sleeve and communicating the inner lubricant groove with the interior of the gear housing; and means providing a second lubricant drain hole including a passage communicating with the outer lubricant groove and opening through the gear housing outer wall radially outwardly of the brake mechanism closure means.

3. The invention defined in claim 2, further characterized in that: the shaft carries a rotatable lubricant-slinging means in substantially radial alinement with the inner lubricant groove.

4. An agricultural tractor, comprising: a longitudinal rear casing including opposite vertical side walls and a bottom structure formed as a longitudinal tunnel having an arch portion providing a bottom wall in the casing and a pair of rigid downwardly extending side portions spaced apart laterally and integral with the bottom wall and respectively providing integral depending extensions of the casing side walls, each of said depending extensions having a laterally outwardly opening pocket; depending housings respectively at opposite sides of the casing, each housing having an inner portion rigidly but removably secured to the proximate side wall and depending alongside and additionally secured rigidly but removably to the proximate depending extension, the inner portion of each of said housings having an opening alined transversely with the proximate pocket; means on each depending housing including a laterally outwardly extending tubular axle housing transversely alined with the proximate opening and pocket; and an axle rotatably carried by each axle housing and extending laterally outwardly therefrom and having an inner end portion passing through said proximate opening and into the associated pocket.

5. In a tractor or the like having a longitudinal body structure: a transmission casing connected to the body structure and including a vertical side wall having an outer mounting face and further being provided with a circular opening therethrough on a transverse axis; drive means in the casing including a transverse shaft extending axially through the side wall opening; an outwardly opening, cup-shaped member including an annular portion fitting the side wall opening, a radial wall portion over the opening and having a central aperture through which said shaft extends, and an annular radial mounting flange joined to the annular portion and having an outer surface external to the casing side wall and an inner surface lying against that portion of the casing wall outer face that surrounds said opening; a plurality of cap screws securing said member to the casing side wall and having their heads laterally outside the outer surface of said mounting flange; and a housing alongside the casing including a pilot portion rigid thereon and surrounding the shaft and projecting into and received by the cup-shaped member, and a second portion radially outside said pilot portion and secured to the casing side wall and recessed to accommodate the heads of the aforesaid cap screws.

6. In a tractor or the like having a longitudinal body structure: a transmission casing connected to the body structure and including an upright side wall having an outer mounting face and further being provided with a circular opening therethrough on a transverse axis; drive means in the casing including a transverse shaft extending axially through the side wall opening; an externally flanged cup-shaped member over the side wall opening and having a central aperture to receive the shaft; means including the externally flanged portion of said member for securing the member to the casing side wall so that said member faces outwardly but projects within the casing; bearing means carried by said member coaxially within said central aperture and inwardly of the casing side wall to journal the shaft; a housing alongside of and secured to the casing side wall and including rigid therewith upright wall structure juxtaposed over the outer face of the side wall and over the cup-shaped member and apertured to receive the shaft, said structure including rigid therewith a bearing carrier coaxially supported on the cup-shaped member; and second bearing means carried by said bearing carrier and recessed in the cup-shaped member and coaxial with and closely spaced outwardly from said first bearing means to journal said shaft outside the casing.

7. In a tractor or the like having a longitudinal body structure: a transmission casing connected to the body structure and including a vertical side wall having an outer mounting face and further being provided with a circular opening therethrough on a transverse axis; drive means in the casing including a transverse shaft extending axially through the side wall opening; an externally flanged cup-shaped member substantially closing the side wall opening but centrally apertured to receive the shaft; means including the externally flanged portion of said member for securing the member to the casing side wall so that said member faces outwardly; bearing means on said member coaxial with the central aperture therein to journal the shaft; a housing alongside the casing including rigid therewith a portion surrounding the side wall opening and a wall portion secured to the casing side wall and apertured to receive the shaft; a flanged ring fixed to the housing wall portion and encircling the shaft and recessed and supported in the cup-shaped member; and second bearing means carried by said ring for journaling the shaft within the housing.

8. In a tractor having a longitudinal body structure: a transmission casing connected to the body structure and having a vertical side wall provided with an outer mounting face and having an opening therethrough; drive means in the casing including a part extending laterally outwardly through said opening; said casing having a portion rigid therewith provided with a laterally outwardly opening pocket in the mounting face thereof spaced from the side wall opening in the plane of the outer mounting face; a housing alongside the casing and removably secured thereto, and including rigid therewith a laterally inwardly projecting portion received within the side wall opening and apertured to receive the aforesaid drive part; and a transversely extending drive part carried by the housing and spaced from said projecting portion on the order of the spacing between the side wall opening and side wall pocket, and including an axially inwardly projecting portion recessed in said pocket.

9. In a tractor having a longitudinal body structure: a transmission casing connected to the body structure and having a vertical side wall provided with an outer mounting face and having an opening therethrough; pilot means carried by said wall in the opening therein and including a removable centrally apertured circular member having an outer peripheral surface fitting the opening and an inner annular surface concentric with the opening; drive means in the casing including a part extending laterally outwardly through the aperture in said member; means removably securing said member to the casing side wall; said casing having rigid therewith a portion provided with a laterally outwardly opening pocket in the mounting face thereof, said pocket being spaced from the member in a radial direction as respects the axis of the drive part; a housing alongside the casing and removably secured thereto, and including rigid therewith a laterally inwardly projecting element having peripheral portions piloted in and received by the inner annular surface of the member and apertured to receive the aforesaid drive part; and a transversely extending drive part carried by the housing and spaced from said projecting element on the order of the radial spacing between the side wall opening and side wall pocket, and including an axially inwardly projecting portion recessed in said pocket.

10. In a tractor: a longitudinal body structure including a drive mechanism casing provided with a side wall and with bottom wall structure and containing drive mechanism including a laterally outwardly extending rotatable part; a housing removably mounted on and alongside the casing side wall, and including an upper portion receiving the outer portion of said rotatable part and a lower portion depending below the level of the casing bottom wall structure; said housing including an inner vertical wall adjacent to the casing side wall and depending below the casing bottom wall structure to lie vertically coextensive with the lower housing portion; bracing means extending inwardly and upwardly from said inner vertical wall to and rigidly joining the casing bottom wall structure; said inner vertical wall including an opening communicating laterally outwardly with the lower housing portion and said bracing means being laterally recessed inwardly in alinement with said opening to provide a pocket; first bearing means carried in said opening; means on the housing including an outwardly extending tubular axle housing in transverse alinement with and having its interior opening inwardly toward said opening in the inner vertical wall; second bearing means at the outer end of the axle housing coaxial with said first bearing means; an axle extending transversely through the axle housing and having an inner end portion journaled in the first bearing means and journaled at a laterally outwardly spaced portion thereof in the second bearing means; drive means in the housing including a first member on the aforesaid rotatable part, and a second member drivably connected to the first member and mounted on the axle between the first and second bearing means and closely adjacent the first bearing means; and securing means on the inner end of the axle and accommodated by said pocket.

WILLARD H. NORDENSON.

REFERENCES CITED

The following references are of record in the file of this patent:

UNITED STATES PATENTS

| Number | Name | Date |
|---|---|---|
| 1,036,659 | Lindsay | Aug. 27, 1912 |
| 1,751,579 | Engstrom | Mar. 25, 1930 |
| 1,932,108 | Johnson et al. | Oct. 24, 1933 |
| 2,074,685 | Engstrom | Mar. 23, 1937 |
| 2,076,009 | Starr et al. | Apr. 6, 1937 |
| 2,247,668 | Rosenthal | July 1, 1941 |
| 2,417,139 | Strehlow | Mar. 11, 1947 |